(12) United States Patent
Zucker et al.

(10) Patent No.: US 10,872,235 B2
(45) Date of Patent: Dec. 22, 2020

(54) TRACKING SHOPPERS AND EMPLOYEES

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 92 days.

(21) Appl. No.: 16/144,401

(22) Filed: Sep. 27, 2018

(65) Prior Publication Data
US 2020/0104583 A1    Apr. 2, 2020

(51) Int. Cl.
*G06K 9/00* (2006.01)
*G06N 3/08* (2006.01)

(52) U.S. Cl.
CPC ..... *G06K 9/00369* (2013.01); *G06K 9/00664* (2013.01); *G06N 3/08* (2013.01)

(58) Field of Classification Search
USPC ......................................................... 382/115
See application file for complete search history.

(56) References Cited

U.S. PATENT DOCUMENTS

| | | | | |
|---|---|---|---|---|
| 2003/0004913 A1* | 1/2003 | Gutta | ............... | G08B 13/19602 706/47 |
| 2005/0055223 A1* | 3/2005 | Khosla | ................... | G06Q 10/06 705/7.42 |
| 2016/0112871 A1* | 4/2016 | White | ................... | H04W 12/06 726/4 |
| 2016/0379145 A1* | 12/2016 | Valentino, III | ......... | G06F 16/27 705/7.13 |
| 2018/0276471 A1* | 9/2018 | Shibata | ............... | G06K 9/00671 |
| 2019/0026543 A1* | 1/2019 | Ozaki | ................ | G06K 9/00268 |
| 2020/0034971 A1* | 1/2020 | Xu | ............................. | G06T 7/11 |

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

* cited by examiner

*Primary Examiner* — Stephen P Coleman
(74) *Attorney, Agent, or Firm* — Schwegman, Lundberg & Woessner (57) ABSTRACT

The system and method discussed herein can capture images from one or more video streams of a store area, can use deep learning to identify people in the images as being a store employee or a shopper, and can use the deep learning to track movement of the people within the store. The tracked movement can provide information that is useful to operators of the store, such as where store employees are, how long they have been in certain areas of the store, which areas of the store need more employees, where most shoppers are concentrated within the store, which areas of the store are popular, and so forth. The system and method can provide instructions to employees on mobile devices or kiosks, in response to the employee locations and activity in the store area. The system and method can also log the movement information, for downstream use.

20 Claims, 4 Drawing Sheets

TRACKING SHOPPERS AND EMPLOYEES

FIELD OF THE DISCLOSURE

The present disclosure relates generally to tracking the movement of people within a confined area.

BACKGROUND OF THE DISCLOSURE

It can be beneficial to track the movement of people within a confined area, such as a shopping area of a store. Tracking the movement of people, through processing of images obtained from one or more cameras in or around the confined area, can be challenging. Algorithms that predict the movement of people, such as by using velocity to predict the movement, can be ineffective for large-scale confined areas.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

The system and method discussed herein can capture images from one or more video streams of a store area, can use deep learning to identify people in the images as being a store employee or a shopper, can use the deep learning to track movement of the people within the store. The tracked movement can provide information that is useful to operators of the store, such as where store employees are, how long they have been in certain areas of the store, which areas of the store need more employees, where most shoppers are concentrated within the store, which areas of the store are popular, and so forth. The system and method can provide instructions to employees on mobile devices or kiosks, in response to the employee locations and activity in the store area. The system and method can also log the movement information, for downstream use.

A camera can monitor a store and each frame is sent to a convolutional neural network deep learning model that does single shot object detection for people. It will be understood that the rate at which frames are sent need not correspond to the frame rate of the video camera. In some examples, the rate at which frames are sent can be 15 or fewer frames per second, 10 or fewer frames per second, 5 or fewer frames per second, one frame per second, or another suitable value. The object detection can return back all people that are present in the image. The images of the people can then be cropped and sent to an alternate convolutional neural network that can computes the graham matrix to figure out the style of the person's clothes. This can perform a binary classification and can produce a two dimensional vector of confidence values for whether the person is a store employee or a general shopper. A supremum of the vector can be taken and its corresponding index in the vector can tell us whether the person is a shopper or a store employee. The system can use techniques like optical flow, kalman filters, and deep KNN, to track the individuals and log their geographical location in the store. Analytics can be easily computed on this data to answer questions like: where are the current store employees, what areas of the store need more store clerks, where do shoppers spend most of their time, what areas of the store are most popular, what areas of the store are least popular, which store employees are not where they are supposed to be, which store employees are not present, how many total shoppers are in the store, and so forth. The system can perform all of these analytics and log them in real time.

One technique that has been developed to perform tracking is known as "deep SORT". Deep SORT improves upon a known "SORT" technique by incorporating appearance information through a pre-trained association metric, which allows deep SORT to perform tracking through longer periods of occlusion.

As an off-the-shelf system, deep SORT is found to be excessively complicated and ill suited for the task of tracking employees and shoppers in a store. The system and method discussed herein include modifications to the deep SORT technique, which result in a technique that is well suited to the task of tracking employees and shoppers in a store.

A first modification includes removing a Kalman filter component from the deep SORT technique. Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each timeframe. Because the Kalman filter is such a useful algorithm, it is unexpected that removing the Kalman filter could prove beneficial.

Whereas the deep SORT technique relied on the Kalman filter to predict possible locations for people, the present technique instead can query a database for each frame, for each instance of a detected person in the frame. Performing the queries in this manner allows the use of multiple cameras, without providing spatial (e.g., x- and y-) coordinates of the cameras and the region of overlap of the fields of view for the cameras.

A second modification includes changing the way the entries are written to and deleted from a database, which corresponds to how person identifications are created and removed. The deep SORT technique creates a person identification when the Kalman filter correctly predicts a location of a person, and deletes the person identification when the person has not been tracked for a specified number of frames.

In contrast with the deep SORT technique, the present technique can create a person identification only in specific zones, such as one or more store entrance, one or more employee entrances, one or more turnstiles, or other suitable choke points through which people can enter the store area. Similarly, in contrast with the deep SORT technique, the present technique can delete a person identification only in specific zones, such as one or more store exits, one or more employee exits, one or more turnstiles, or other suitable choke points through which people can exit the store area.

Restricting the creation and deletion of person identifications in this manner can increase the probability of correctly performing a match of a person in the store area, because there are only relatively few (e.g., a relatively small integer, such as one, two, three, four, five, six, between one and ten, or between one and twenty) ways to enter and exit the store area.

Figure 1:
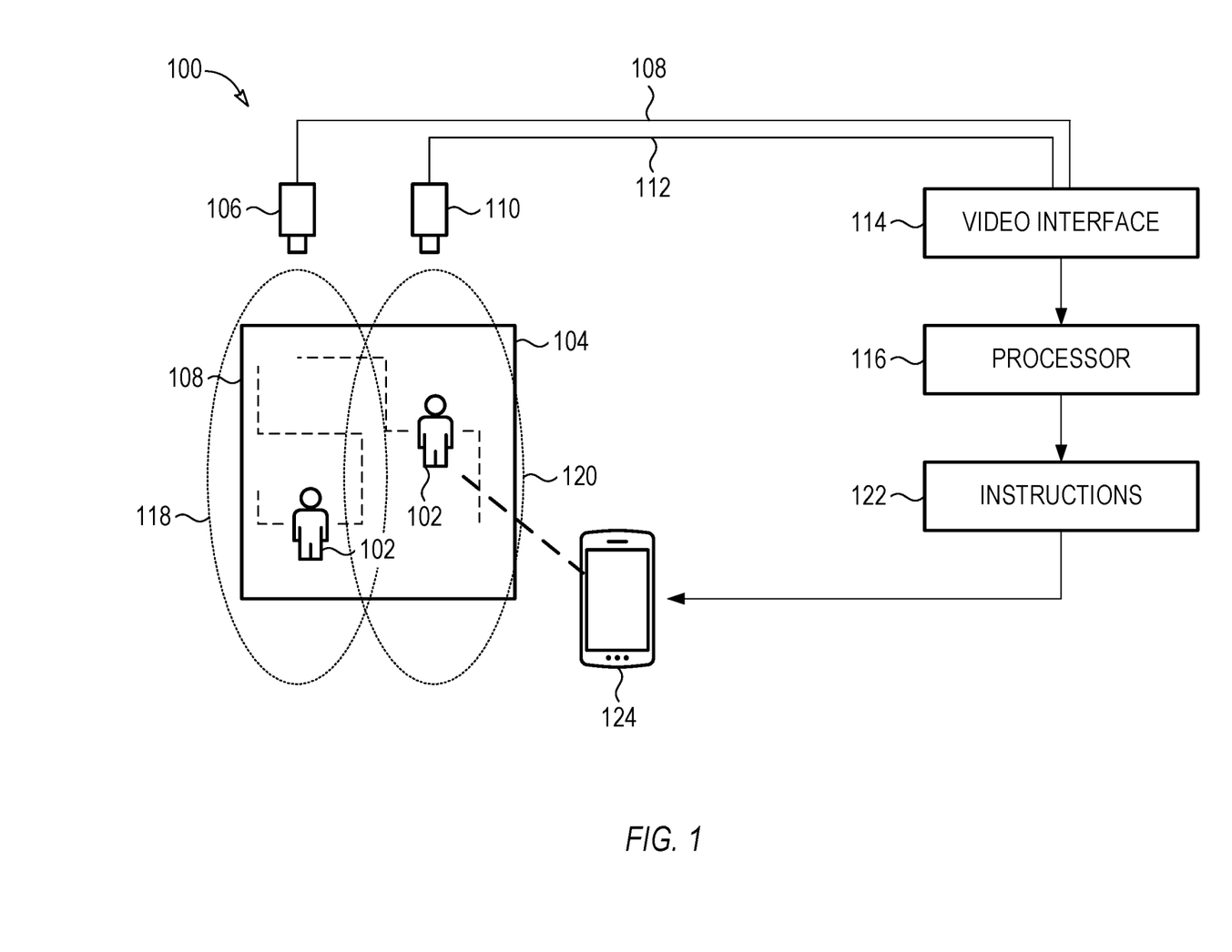
FIG. 1 shows an example of a system that can track the movement of people within a confined area, such as a store, in accordance with some examples.

FIG. 1 shows an example of a system 100 that can track the movement of people 102 within a confined area 104, such as a store, in accordance with some examples. The configuration of FIG. 1 is but one example; other suitable configurations can also be used.

A video camera 106 can be positioned to capture a video stream 108 of a confined area 104, such as the shopping area of a store. In some examples, an optional second video camera 110 can be positioned to capture an optional second video stream 112 of at least a portion of the confined area 104. In some examples, the fields of view 118, 120 of the cameras can overlap in at least a portion of the confined area 104. In other examples, the fields of view may not overlap. In some examples, the video streams from the cameras can be processed downstream in a manner such that the cameras need not be explicitly aligned or registered to each other, such as by providing spatial (x, y, z) coordinates of the cameras. Eliminating the alignment of the cameras to each other is a benefit of the manner in which the video streams are processed. In some examples, there can be more than two cameras, each producing a corresponding video stream of at least a portion of the confined area 104.

A video interface 114 can receive the video stream 108, the optional second video stream 112, and any optional additional streams from optional additional cameras. In some examples, the video interface 114 can be a stand-alone piece of hardware, coupled to additional processors and networks as needed. In other examples, the video interface can include one or more dedicated cards in a computer or server. In still other examples, the video interface can be realized entirely in software and coupled to the processor, discussed below.

A processor 116 can be coupled to the video interface 114. The processor 116 can include one or more processors in a machine running locally (e.g., in the store), and/or one or more processors in a server at a remote location and connected to a server in the store through suitable network connections. The processor 116 can execute computing instructions to perform data processing activities. The data processing activities can include operations that pertain to processing of the video stream 108, the optional second video stream 112, and any optional additional streams from optional additional cameras. Such operations are explained in the context of FIG. 2.

In some examples the processor 116 can automatically send instructions 122 to a smart phone 124 of a particular person 102 in the confined area 104. For example, the person 102 can be a store employee, and the instructions 122 can include a message instructing the person 102 to walk to a particular part of the store that needs attention. This is but one example of instructions; other suitable instructions can also be used.

Figure 2:
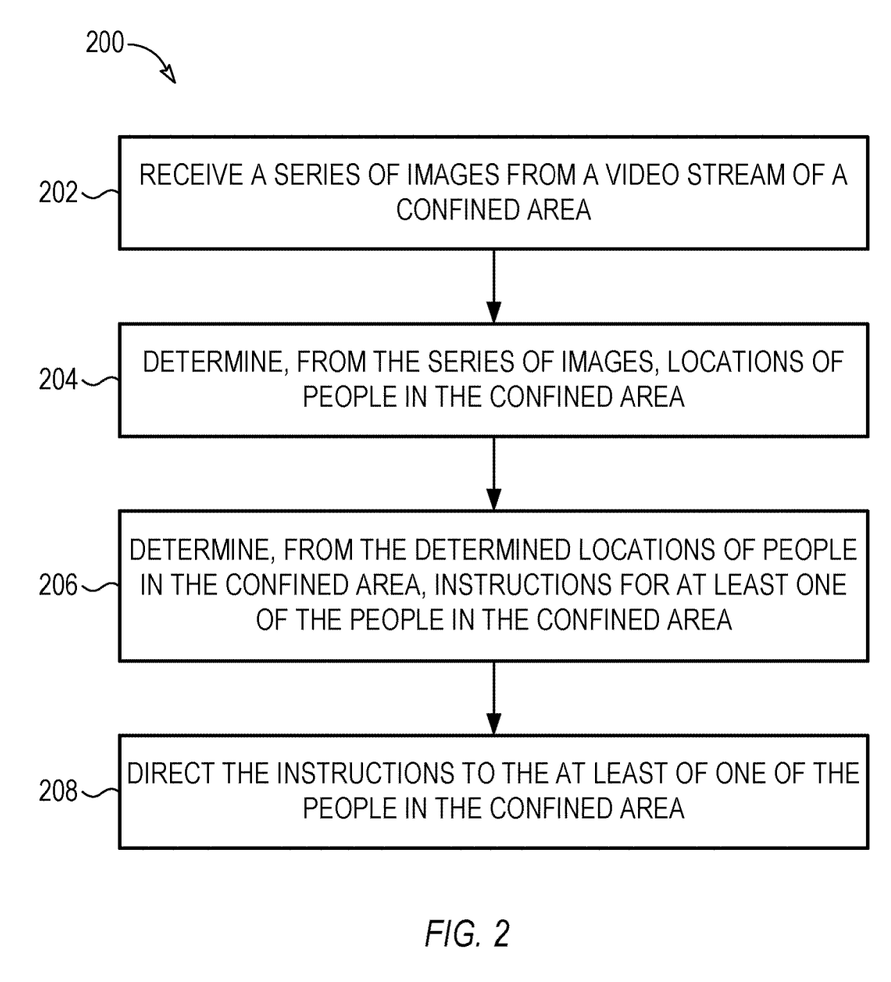
FIG. 2 shows a flowchart of an example of a method for tracking the movement of people within a confined area, such as a store, in accordance with some examples.

FIG. 2 shows a flowchart of an example of a method 200 for tracking the movement of people within a confined area, such as a store, in accordance with some examples. The method 200 of FIG. 2 can be executed by the system 100 of FIG. 1, or any other suitable system. The method 200 of FIG. 2 is but one example of a method for tracking the movement of people within a confined area; other suitable methods can also be used. As explained above, the processor coupled to the video interface can execute computing instructions to perform data processing activities. The data processing activities can include the operations shown in FIG. 2 and discussed below.

At operation 202, the system can receive a series of images from a video stream of a confined area, such as a shopping area of a store.

At operation 204, the system can determine, from the series of images, locations of people in the confined area. In some examples, the processor can use a first convolutional neural network to determine the locations of the people in the confined area.

At operation 206, the system can determine, from the determined locations of people in the confined area, instructions for at least one of the people in the confined area. In some examples, the instructions can include a request to attend to an area of the store that requires more store clerks.

At operation 208, the system can direct the instructions to the at least of one of the people in the confined area. In some examples, directing the instructions can include sending a message to an employee's smart phone. In other examples, the instructions can include displaying an alert to a kiosk.

In some examples, the system can automatically determine, from the series of images, whether each person in the confined area is a shopper or an employee of the store, based on clothing worn by the person. For example, if the system determines that the person is wearing a shirt having a specified color and style, the system can decide that the person is a store employee. Other examples are possible, such as being positioned in a specific entrance area (such as an employee entrance), wearing some sort of identification authentication when the person enters an area, standing at a QR code or other visual index, checking in with an identification badge, and so forth.

In some examples, the processor of the system can use a second convolutional neural network to analyze the clothing worn by each person to automatically determine if the person is a shopper or an employee of the store. In some examples, the second convolutional neural network can compute a graham matrix for each person to determine whether the person is a shopper or an employee of the store. In some examples, the graham matrix can include a two-dimensional vector of confidence values, the two-dimensional vector having a supremum, the supremum having an index in the two-dimensional vector, the index indicating whether the person is a shopper or an employee of the store.

In some examples, the system can track the movement of people over time. In some examples, the system can improve on a known way of tracking people. For example, whereas a known deep SORT technique creates a person identification when the Kalman filter correctly predicts a location of a person, and deletes the person identification when the person has not been tracked for a specified number of frames, the present system can instead operate on a principle that people enter the confined area at a particular location, exit the confined area at a particular location, and remain within the confined area between those two events. In some examples, the system can log people as entries in a database, such that an entry is created when a person is first detected within the confined area, and the entry is deleted when the person is determined to be absent from the confined area. In some examples, the system can create entries only for one or more specified entry areas within the confined area, and delete entries only for one or more specified exit areas within the confined area. The specified entry and exit areas can be separate areas in the confined area, or a single area in the confined area.

Figure 3:
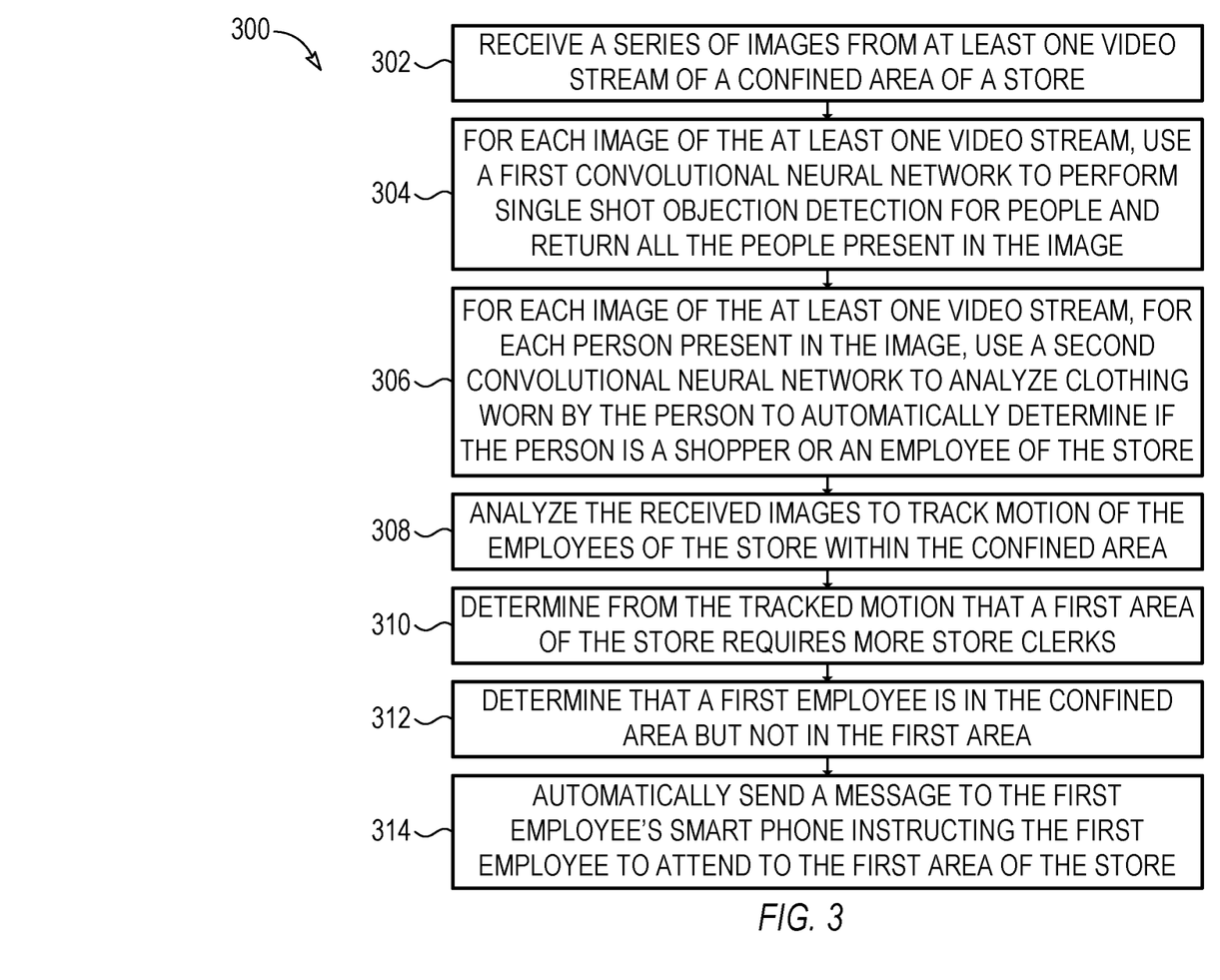
FIG. 3 shows a flowchart of another example of a method for tracking the movement of people within a confined area, such as a store, in accordance with some examples.

FIG. 3 shows a flowchart of another example of a method 300 for tracking the movement of people within a confined area, such as a store, in accordance with some examples. The method 300 of FIG. 3 can be executed by the system of FIG. 1, or any other suitable system. The method 300 of FIG. 3 is but one example of a method for tracking the movement of people within a confined area; other suitable methods can also be used. As explained above, the processor coupled to the video interface can execute computing instructions to perform data processing activities. The data processing activities can include the operations shown in FIG. 3 and discussed below.

At operation 302, the system can receive a series of images from at least one video stream of a confined area of a store.

At operation 304, the system can, for each image of the at least one video stream, use a first convolutional neural network to perform single shot objection detection for people and return all the people present in the image.

At operation 306, the system can, for each image of the at least one video stream, for each person present in the image, use a second convolutional neural network to analyze clothing worn by the person to automatically determine if the person is a shopper or an employee of the store. The convolutional neural network can be implemented in a deep learning configuration executed on one or more processors.

At operation 308, the system can analyze the received images to track motion of the employees of the store within the confined area.

At operation 310, the system can determine from the tracked motion that a first area of the store requires more store clerks.

At operation 312, the system can determine that a first employee is in the confined area but not in the first area.

At operation 314, the system can automatically send a message to the first employee's smart phone instructing the first employee to attend to the first area of the store. In some examples, the message can be a text message, a page, an email, or an automatically-generated phone call.

In some examples, the system can additionally log people as entries in a database, such that an entry is created when a person is first detected within the confined area, and the entry is deleted when the person is determined to be absent from the confined area.

In some examples, the system can additionally log people as entries in a database, such that an entry is created when a person is first detected within one or more specified entry areas within the confined area, and the entry is deleted when the person is last detected to be within one or more specified exit areas within the confined area.

In some examples, a deep learning model can be trained to differentiate among people (e.g., recognize individual people) in a retail store, from a high incident angle (e.g., from a ceiling-mounted or raised camera, rather than from eye level). The bottom layer of the deep learning model can be removed, with features that help differentiate among the various people in the video images. In general, the bottom layer of a multi-layer model architecture can be particularly adept at recognizing people. Other layers in the architecture can be particularly adept at other tasks represented by linear algebra. This can generate data points. The system can store the data points in a nearest neighbor-like database.

When a person enters an entry area of a store, the system can create an entry in the database. When the person is walking around the store, the system can query the data with particular features determined from the video images, to see which saved entry (ID) in the database corresponds to the person. When the person enters an exit area of the store, the system can query the database and delete the person's entry from the database. In some examples, the database can be written to a memory device, like a storage medium or disk. In other examples, the database can be stored in memory, which can be faster than writing the database to disk and reading from disk.

Figure 4:
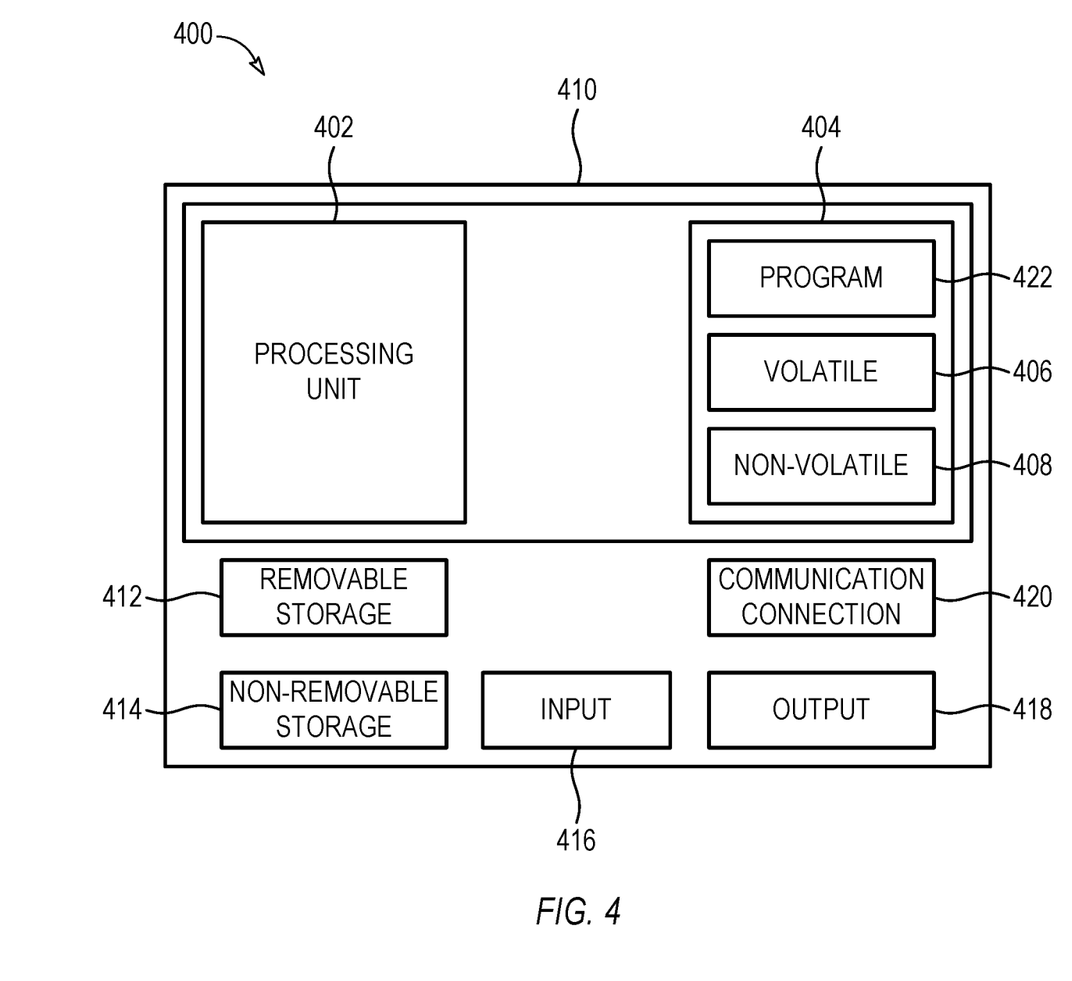
FIG. 4 shows a block diagram of an example of a controller, in accordance with some examples.

FIG. 4 shows a block diagram of an example of a controller 400, in accordance with some examples. The controller 400 can be part of a system that can track people in a confined area, such as a store. The example of FIG. 4 is but one configuration for a controller; other configurations can also be used.

In one example, multiple such controllers 400 are utilized in a distributed network to implement multiple components in a transaction based environment. An object-oriented, service-oriented, or other architecture may be used to implement such functions and communicate between the multiple controllers 400 and components.

One example of a controller 400, in the form of a computer 410, can include a processing unit 402, memory 404, removable storage 412, and non-removable storage 414. Memory 404 may include volatile memory 406 and non-volatile memory 408. Computer 410 may include, or have access to a computing environment that includes, a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 can include a video interface. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 422 with instructions for the computer 410, according to the teachings of the present disclosure, may be included on a CD-ROM and loaded from the CD-ROM to a hard drive. The computer-readable instructions allow computer 410 to provide generic access controls in a COM based computer network system having multiple users and servers.

In the foregoing detailed description, the method and apparatus of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the device and related method disclosed herein, a non-limiting list of examples is provided below. Each of the following non-limiting examples can stand on its own, or can be combined in any permutation or combination with any one or more of the other examples.

In Example 1, a system can include: a video camera positioned to capture a video stream of a confined area; a video interface configured to receive the video stream; and a processor coupled to the video interface and configured to execute computing instructions to perform data processing activities, the data processing activities comprising: receiving a series of images from the video stream; determining, from the series of images, locations of people in the confined area; determining, from the determined locations of people in the confined area, instructions for at least one of the people in the confined area; and directing the instructions to the at least of one of the people in the confined area.

In Example 2, the system of Example 1 can optionally be configured such that the processor is configured to use a first convolutional neural network to determine the locations of the people in the confined area.

In Example 3, the system of any one of Examples 1-2 can optionally be configured such that the confined area is a shopping area of a store.

In Example 4, the system of any one of Examples 1-3 can optionally be configured such that the data processing activities further include: automatically determining, from the series of images, whether each person in the confined area is a shopper or an employee of the store, based on clothing worn by the person.

In Example 5, the system of any one of Examples 1-4 can optionally be configured such that the processor is configured to use a second convolutional neural network to analyze the clothing worn by each person to automatically determine if the person is a shopper or an employee of the store.

In Example 6, the system of any one of Examples 1-5 can optionally be configured such that the second convolutional neural network computes a graham matrix for each person to determine whether the person is a shopper or an employee of the store.

In Example 7, the system of any one of Examples 1-6 can optionally be configured such that the graham matrix includes a two-dimensional vector of confidence values, the two-dimensional vector having a supremum, the supremum having an index in the two-dimensional vector, the index indicating whether the person is a shopper or an employee of the store.

In Example 8, the system of any one of Examples 1-7 can optionally be configured such that directing the instructions includes sending a message to an employee's smart phone instructing the employee to attend to an area of the store that requires more store clerks.

In Example 9, the system of any one of Examples 1-8 can optionally be configured such that the data processing activities further include: log people as entries in a database, such that an entry is created when a person is first detected within the confined area, and the entry is deleted when the person is determined to be absent from the confined area.

In Example 10, the system of any one of Examples 1-9 can optionally be configured such that data processing activities further include: create entries only for one or more specified entry areas within the confined area; and delete entries only for one or more specified exit areas within the confined area.

In Example 11, the system of any one of Examples 1-10 can optionally further include a second video camera positioned to capture a second video stream of at least a portion of the confined area; wherein the video interface is further configured to receive the second video stream; and wherein the data processing activities further include: receiving a second series of images from the second video stream; and determining, from the series of images and the second series of images, the locations of people in the confined area.

In Example 12, the system of any one of Examples 1-11 can optionally be configured such that the processor does not rely on spatial coordinates of the plurality of video cameras to determine the locations of people in the confined area.

In Example 13, a method can include: receiving a series of images from at least one video stream of a confined area of a store; and for each image of the at least one video stream: using a first convolutional neural network to perform single shot objection detection for people and return all the people present in the image; and for each person present in the image, using a second convolutional neural network to analyze clothing worn by the person to automatically determine if the person is a shopper or an employee of the store; analyzing the received images to track motion of the employees of the store within the confined area; determining from the tracked motion that a first area of the store requires more store clerks; determining that a first employee is in the confined area but not in the first area; and automatically sending a message to the first employee's smart phone instructing the first employee to attend to the first area of the store.

In Example 14, the method of Example 13 can optionally further include logging people as entries in a database, such that an entry is created when a person is first detected within the confined area, and the entry is deleted when the person is determined to be absent from the confined area.

In Example 15, the method of any one of Examples 13-14 can optionally further include logging people as entries in a database, such that an entry is created when a person is first detected within one or more specified entry areas within the confined area, and the entry is deleted when the person is last detected to be within one or more specified exit areas within the confined area.

In Example 16, a system can include: a video camera positioned to capture a video stream of a confined area; a video interface configured to receive the video stream; and a processor coupled to the video interface and configured to execute computing instructions to perform data processing activities, the data processing activities comprising: receiving a series of images from at least one video stream of a confined area of a store; determining, from the series of images, locations of people in the confined area; automatically determining, from the series of images, whether each person in the confined area is a shopper or an employee of the store, based on clothing worn by the person; determining, from the determined locations of the shoppers and employees in the confined area, that an area of the store requires more store clerks; and sending a message to an employee's smart phone instructing the employee to attend to the area of the store that requires more store clerks.

In Example 17, the system of Example 16 can optionally be configured such that the data processing activities further comprise: logging people as entries in a database, such that an entry is created when a person is first detected within the confined area, and the entry is deleted when the person is determined to be absent from the confined area.

In Example 18, the system of any one of Examples 16-17 can optionally be configured such that the data processing activities further comprise: creating entries only for one or more specified entry areas within the confined area; and deleting entries only for one or more specified exit areas within the confined area.

In Example 19, the system of any one of Examples 16-18 can optionally further include a second video camera positioned to capture a second video stream of at least a portion of the confined area; wherein the video interface is further configured to receive the second video stream; and wherein the data processing activities further comprise: receiving a second series of images from the second video stream; and determining, from the series of images and the second series of images, the locations of people in the confined area.

In Example 20, the system of any one of Examples 16-19 can optionally be configured such that wherein the at least one video stream includes a plurality of video streams; and further comprising a plurality of video cameras, coupled to the processor, and positioned to capture the plurality of video streams of the confined area, wherein the processor does not rely on spatial coordinates of the plurality of video cameras to determine the locations of people in the confined area.

What is claimed is:

1. A system, comprising:
   a video camera positioned to capture a video stream of a first confined area and a second confined area, wherein the first confined area is at least one of an entrance or an exit of a store;
   a video interface configured to receive the video stream; and
   a processor coupled to the video interface and configured to execute computing instructions to perform data processing activities, the data processing activities comprising:
   receiving a series of images from the video stream;
   identifying a first person in the first confined area, wherein the first person is a shopper, and wherein the first confined area is an entrance to the store;
   tracking from the series of images, a movement of the first person throughout the store;
   determining, from the series of images, a location of the first person in a second confined area;
   determining, from the series of images, a location of a second person in the second confined area, wherein the second person is an employee of the store;
   determining, from the location of the first person and the location of the second person in the second confined area, an instruction for the second person;
   directing the instruction to the second person; and
   determining, from the series of images, when the first person exits the store though the first confined area.

2. The system of claim 1, wherein the processor is configured to use a first convolutional neural network to determine the location of the first person and the second person in the second confined area.

3. The system of claim 1, wherein the data processing activities further comprise:
   log at least one of the first person or the second person as an entry in a database, such that the entry is created when at least one of the first person or the second person is first detected within at least one of the first confined area or the second confined area, and the entry is deleted when the at least one of the first person or the second person is determined to be absent from the at least one of the first confined area or the second confined area.

4. The system of claim 3, wherein the data processing activities further comprise:
   create entries only for one or more specified entry areas within the at least one of the first confined area or the second confined area; and
   delete entries only for one or more specified exit areas within the at least one of the first confined area or the second confined area.

5. The system of claim 1,
   further comprising a second video camera positioned to capture a second video stream of at least a portion of the confined area;
   wherein the video interface is further configured to receive the second video stream; and
   wherein the data processing activities further comprise:
   receiving a second series of images from the second video stream; and
   determining, from the series of images and the second series of images, the location of at least one of the first person or the second person in the second confined area.

6. The system of claim 5, wherein the processor does not rely on spatial coordinates of the plurality of video cameras to determine the locations of people in the confined area.

7. The system of claim 1, second confined area is a shopping area of a store.

8. The system of claim 7, wherein the data processing activities further comprise:
   automatically determining, from the series of images, whether at least one of the first person or the second person in the confined area is the shopper or the employee of the store, based on clothing worn by the at least one of the first person or the second person.

9. The system of claim 1, wherein directing the instruction includes sending a message to a smart phone of the second person instructing the second person to attend to an area of the store that requires more store clerks.

10. The system of claim 8, wherein the processor is configured to use a second convolutional neural network to analyze the clothing worn by the at least one of the first person or the second person to automatically determine if the at least one of the first person or the second person is a shopper or an employee of the store.

11. The system of claim 10, wherein the second convolutional neural network computes a graham matrix for the at least one of the first person or the second person to determine whether the at least one of the first person or the second person is a shopper or an employee of the store.

12. The system of claim 11, wherein the graham matrix includes a two-dimensional vector of confidence values, the two-dimensional vector having a supremum, the supremum having an index in the two-dimensional vector, the index indicating whether the at least one of the first person or the second person is a shopper or an employee of the store.

13. A method, comprising:
   receiving a series of images from at least one video stream of a first confined area and a second confined area of a store, wherein the first confined area is at least one of an entrance or an exit of the store; and
   for each image of the at least one video stream:
   using a first convolutional neural network to perform single shot objection detection for people and return all the people present in the image; and
   for each person present in the image, using a second convolutional neural network to analyze clothing won by the person to automatically determine if the person is a shopper or an employee of the store;
   analyzing the received images to track motion of the shoppers within the second confined area;

analyzing the received images to track motion of the employees of the store within the second confined area;

determining from the tracked motion that a location within the second confined area requires more store clerks;

determining that a first employee is in the second confined area but not in the location within the second confined area;

automatically sending a message to the first employee's smart phone instructing the first employee to attend to the location within the second confined area; and determining when the shoppers exit the store by passing through the first confined area.

14. The method of claim 13, further comprising logging people as entries in a database, such that an entry is created when a person is first detected within at least one of the first confined area or the second confined area the confined area, and the entry is deleted when the person is determined to be absent from the at least one of the first confined area or the second confined area the confined area.

15. The method of claim 13, further comprising logging people as entries in a database, such that an entry is created when a person is first detected within one or more specified entry areas within at least one of the first confined area or the second confined area, and the entry is deleted when the person is last detected to be within one or more specified exit areas within at least one of the first confined area or the second the confined are.

16. A system, comprising:
a video camera positioned to capture a video stream of a first confined area and a second confined area;
a video interface configured to receive the video stream; and
a processor coupled to the video interface and configured to execute computing instructions to perform data processing activities, the data processing activities comprising:
receiving a series of images from at least one video stream of a confined area of a store;
identifying a first person in the first confined area, wherein the first person is a shopper, and wherein the first confined area is at least one of an entrance or an exit to the store;
tracking, using the series of images, a movement of the first person throughout the store;
determining, from the series of images, a location of the first person in a second confined area;
determining, from the series of images, a location of a second person in the second confined area, wherein the second person is an employee of the store;
automatically determining, from the series of images, whether at least one of the first person or the second person in the second confined area is the shopper or the employee of the store, based on clothing worn by the at least one of the first person or the second person;

determining, from the location of the first person and the location of the second person in the second confined area, that an area of the store the location of the first person in the second confined area requires more store clerks;

sending a message to a smart phone of the second person instructing the second person to attend to the location of the first person within the second confined area; and determining, from the series of images, when the first person exits the store through the first confined area.

17. The system of claim 16,
further comprising a second video camera positioned to capture a second video stream of at least a portion of at least one of the first confined area or the second confined area;
wherein the video interface is further configured to receive the second video stream; and
wherein the data processing activities further comprise:
receiving a second series of images from the second video stream; and
determining, from the series of images and the second series of images, the locations of the at least one of the first person or the second person in the at least one of the first confined area or the second confined area people in the confined area.

18. The system of claim 16,
wherein the at least one video stream includes a plurality of video streams; and
further comprising a plurality of video cameras, coupled to the processor, and positioned to capture the plurality of video streams of the confined area, wherein the processor does not rely on spatial coordinates of the plurality of video cameras to determine the locations of people in the confined area.

19. The system of claim 16, wherein the data processing activities further comprise:
logging people as entries in a database, such that an entry is created when at least one of the first person or the second person is first detected within at least one of the first confined area or the second confined area, and the entry is deleted when the at least one of the first person or the second person is determined to be absent from the at least one of the first confined area or the second confined area.

20. The system of claim 19, wherein the data processing activities further comprise:
creating entries only for one or more specified entry areas within the at least one of the first confined area or the second confined area; and
deleting entries only for one or more specified exit areas within the at least one of the first confined area or the second confined area.

* * * * *